United States Patent
Kumagai et al.

(10) Patent No.: US 11,003,854 B2
(45) Date of Patent: May 11, 2021

(54) ADJUSTING AN OPERATION OF A SYSTEM BASED ON A MODIFIED LEXICAL ANALYSIS MODEL FOR A DOCUMENT

(71) Applicant: International Business Machines Corporation, Armonk, NY (US)

(72) Inventors: Ken Kumagai, Tokyo (JP); Akihiro Nakayama, Kawasaki (JP); Kei Sugano, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 16/174,635

(22) Filed: Oct. 30, 2018

(65) Prior Publication Data
US 2020/0134015 A1  Apr. 30, 2020

(51) Int. Cl.
*G06F 17/27* (2006.01)
*G06F 40/284* (2020.01)
*G06N 3/08* (2006.01)
*G06F 40/268* (2020.01)

(52) U.S. Cl.
CPC .......... *G06F 40/284* (2020.01); *G06F 40/268* (2020.01); *G06N 3/08* (2013.01)

(58) Field of Classification Search
CPC .... G06F 16/258; G06F 40/268; G06F 40/284; G06F 40/295
See application file for complete search history.

(56) References Cited

U.S. PATENT DOCUMENTS

| | | | | |
|---|---|---|---|---|
| 6,810,375 | B1 * | 10/2004 | Ejerhed | G06F 40/284 704/9 |
| 7,117,231 | B2 * | 10/2006 | Fischer | H04N 21/235 |
| 8,862,989 | B2 | 10/2014 | Kung et al. | |
| 9,058,317 | B1 * | 6/2015 | Gardner | G06F 40/268 |
| 9,239,826 | B2 | 1/2016 | Selegey et al. | |
| 2001/0009009 | A1 * | 7/2001 | Iizuka | G06F 40/53 715/259 |
| 2003/0023425 | A1 * | 1/2003 | Pentheroudakis | G06F 40/226 704/9 |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Olujimi A Adesanya
(74) *Attorney, Agent, or Firm* — Law Office of Jim Boice

(57) ABSTRACT

A method retrains a lexical analysis model. One or more processors divide a token in a document into a first sub-token having a boundary that begins with a start point of a mention and a second sub-token that ends at an end point of the mention. The processor(s) determine that the start/end point of the mention does not coincide with a start/end point of the first sub-token; concatenate the first sub-token with the second sub-token to create a concatenated token; and store the concatenated token in a user dictionary for the document. The processor(s) perform a morphological analysis of the document using the concatenated token from the user dictionary, and retrain a lexical analysis model for the document by leveraging the performing of the morphological analysis of the document.

14 Claims, 13 Drawing Sheets

(56) References Cited

U.S. PATENT DOCUMENTS

| | | | |
|---|---|---|---|
| 2003/0055626 A1* | 3/2003 | Miyahira | G06F 40/289 704/9 |
| 2008/0162118 A1* | 7/2008 | Itoh | G06F 40/284 704/10 |
| 2008/0221863 A1* | 9/2008 | Liu | G06F 40/53 704/2 |
| 2016/0314123 A1* | 10/2016 | Ramachandran | G06F 16/24578 |
| 2016/0321239 A1* | 11/2016 | Iso-Sipila | G06F 40/284 |
| 2017/0011289 A1 | 1/2017 | Gao et al. | |
| 2017/0011739 A1 | 1/2017 | Huang | |
| 2017/0371858 A1 | 12/2017 | Hosokawa et al. | |

OTHER PUBLICATIONS

IBM Corporation, "Watson Knowledge Studio" www.ibm.com, <https://www.ibm.com/watson/services/knowledge-studio/>, Retrieved Jun. 18, 2018, pp. 1-2.

Anonymous, "Japanese Input Methods" Wikipedia, <https://en.wikipedia.org/wiki/Japanese_input_methods>, Retrieved Jun. 18, 2018, Last Edited Apr. 30, 2018, pp. 1-6.

* cited by examiner

US 11,003,854 B2

ADJUSTING AN OPERATION OF A SYSTEM BASED ON A MODIFIED LEXICAL ANALYSIS MODEL FOR A DOCUMENT

BACKGROUND

The present invention relates to the field of text analysis, and particularly to the field of morphological text analysis using a lexical analysis. Still more particularly, the present invention relates to the use of lexical analysis models for analyzing text.

SUMMARY

In an embodiment of the present invention, a method retrains a lexical analysis model. One or more processors divide a token in a document into a first sub-token having a boundary that begins with a start point of a mention and a second sub-token that ends at an end point of the mention. The processor(s) determine that the start point of the mention does not coincide with a start point of the first sub-token, and that the end point of the mention does not coincide with the end point of the first sub-token. In response to determining that the start point of the mention does not coincide with the start point of the first sub-token and that the end point of the mention does not coincide with the end point of the first sub-token, the processor(s) concatenate the first sub-token with the second sub-token to create a concatenated token, and store the concatenated token in a user dictionary for the document. The processor(s) perform a morphological analysis of the document using the concatenated token from the user dictionary, and retrain a lexical analysis model for the document by leveraging the performing of the morphological analysis of the document.

In an embodiment of the present invention, a method retrains a lexical analysis model. A computer morphologically analyzes a document using a system dictionary, and then adds delimiters of sentences, delimiters of tokens, and annotations of parts of speech in the document. The computer changes a result of the morphological analysis of the document through an annotating operation. The annotating operation includes: providing a user dictionary for holding token information specific to a user; dividing a token in the document into a first sub-token having a boundary that begins with a start point of a mention and a second sub-token that ends at an end point of the mention; determining that the start point/end point of the mention does not coincide with a start point/end point of the first sub-token; in response to determining that the start point/end point of the mention does not coincide with the start point/end point of the first sub-token, concatenating the first sub-token with the second sub-token to create a concatenated token; and storing the concatenated token in the user dictionary for the document. The computer performs a subsequent morphological analysis process using the system dictionary and the concatenated token from the user dictionary, and then retrains a lexical analysis model for the document by leveraging the performing of the subsequent morphological analysis process.

In one or more embodiments, the method(s) described herein are performed by an execution of a computer program product and/or a computer system.

DETAILED DESCRIPTION

Figure 1:
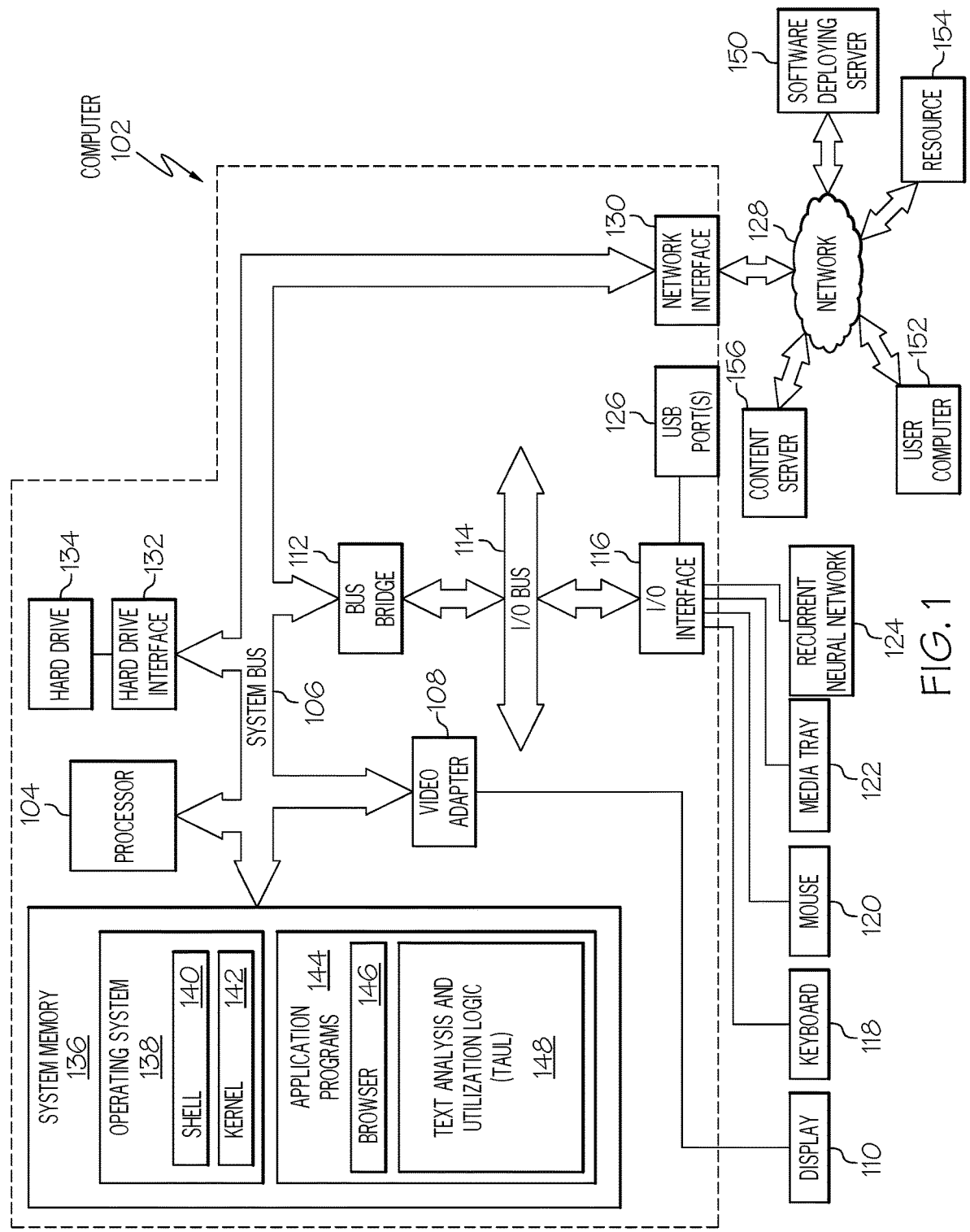
FIG. 1 depicts an exemplary system and network in which the present invention may be implemented.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also be stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or user's computer 152 and/or resource 154 and/or content server 156.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a recurrent neural network 124 (described in greater detail in an exemplary embodiment depicted in FIG. 7), and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, a user's computer 152, a resource 154, and/or a content server 156 using a network interface 130. Network interface 130 is a hardware network interface, such as a network interface card (NIC), etc.

Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Text Analysis and Utilization Logic (TAUL) 148. TAUL 148 includes code for implementing the processes described below, including those described in FIGS. 2-9. In one embodiment, computer 102 is able to download TAUL 148 from software deploying server 150, including in an on-demand basis, wherein the code in TAUL 148 is not downloaded until needed for execution. Note further that, in one embodiment of the present invention, software deploying server 150 performs all of the functions associated with the present invention (including execution of TAUL 148), thus freeing computer 102 from having to use its own internal computing resources to execute TAUL 148.

Resource 154 is a resource that is available to a user of the user's computer 152 if so warranted based on the content analysis and/or lexical analysis model retraining described herein.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

As used herein, the term "morphological analysis" is defined as a process of sentence split, tokenization, and part-of-speech tagging of content. In one or more embodiments of the present invention, morphological analysis utilizes natural language processing to split the sentence(s), tokenize the content, and tag the content with part-of-speech labels.

As used herein, the term "token" is defined as a minimum unit of configuration elements of a sentence, such as a word, a unit of punctuation, a phrase, etc. In one or more embodiments of the present invention, the configuration elements are obtained as a result of the morphological analysis, and/or have positional information (i.e., where the token begins and ends in the document).

As used herein, the term "type" is defined as a label that describes a particular token, and serves as a detection target in machine learning. Examples of such a label are "PERSON", "LOCATION", etc. In one or more embodiments of the present invention, the type/label is manually created by the user, while in other embodiments the type/label is created as a result of the morphological analysis.

As used herein, the term "mention" is defined as one of the annotations. In one or more embodiments of the present invention, each "mention" has positional information that describes where the mention begins and ends in the document. In one or more embodiments of the present invention, each "mention" also includes the "type" of a particular token.

As used herein, the term "relation" is one of the annotations, and describes the contextual relationship between two mentions and where the two mentions are "from" and "to". That is, the relation describes the range of the two mentions in the document.

In accordance with one or more embodiments of the present invention, morphological analysis analyzes a document by identifying tokens in the document, and adds delimiters (start/end point(s)) of sentences in the document, adds delimiters of tokens, and identifies parts of speech of the tokens.

In addition, mentions and relations are created for the document. However, this can result in the creation of an annotation that has delimiters that are different from delimiters of sentences or delimiters of tokens. That is, a mention can be discontinuous in the middle of a token.

The learning of a model of mentions and relations using prior art inconsistent morphological analysis results and annotations seriously degrades the accuracy. Furthermore, since sentence delimiters and token delimiters are different on a user-by-user basis, a prior art approach of providing the optimal delimiters among delimiters preliminarily prepared by the system does not work well. As such, one or more embodiments of the present invention provides the following methodology.

Specifically, one or more embodiments of the present invention change a morphological analysis process using the user's annotation creation operation (e.g., mention, and relation). The system implicitly collects annotating operations performed by the user, and corrects the morphological analysis process based on the collected operations. The corrected morphological analysis process is then used for learning of mentions and relations that is to be performed later.

As described herein, in one or more embodiments the present invention changes a morphological analysis process using an annotation creation operation by the user according to the following operations. The system prepares dictionaries (hereinafter called user dictionaries) on a user-by-user basis. Token information is held according to the user's annotation creation operation results. The token information includes a surface (i.e., the actual token terms/punctuation used in the document) and/or includes one or more types that describe the token. In one or more embodiments of the present invention, the token information also includes, as metadata, another token if a sentence delimiter is difficult to intervene.

In accordance with one or more embodiments of the present invention, the system first performs an annotation creation operation (creation of mentions and relations).

Create a Mention

If a sentence delimiter intervenes between the start point and end point of a mention, a token in which the last and penultimate tokens before the sentence delimiter are concatenated is registered in a user dictionary together with the type name.

At the same time, the pair of tokens before and after the sentence delimiter are added into the user dictionary.

If the start point (end point) of the mention does not coincide with the start point (end point) of the token, the token is divided into two tokens at a boundary, which is the start point (end point) of the mention, and registered in the user dictionary. The latter (former) is registered together with the type name.

Create a Relation

If a sentence delimiter intervenes between two mentions, a token in which the last and penultimate tokens before the sentence delimiter are concatenated is registered in the user dictionary.

At the same time, the pair of tokens before and after the sentence delimiter are added into the user dictionary.

Update a Morphological Analysis Process Model

A morphological analysis process model is then updated based on the user dictionary and a system dictionary (a standard dictionary held by the system).

The system updates the token information registered in the user dictionary according to the following procedures. First, the morphological information registered in the system dictionary is added to the token registered in the user dictionary. Next, an unregistered token is complemented with morphological information (e.g., part of speech) from the same type of token provided by the user. The same type of token tends to have morphological information with the same tendency, and in one or more embodiments of the present invention, the frequency of the token use in the document is used to define the token type.

In one or more embodiments of the present invention, the process to update the morphological analysis process model is performed when the user creates an annotation. In an alternative embodiment, the process to update the morphological analysis process model is comprehensively executed before transition to a machine learning process of naming tokens, describing entities represented by the tokens, and extracting the tokens. Use of this alternative embodiment results in a morphological analysis process model update that is achieved after the accumulation of the user dictionary.

Figure 2:
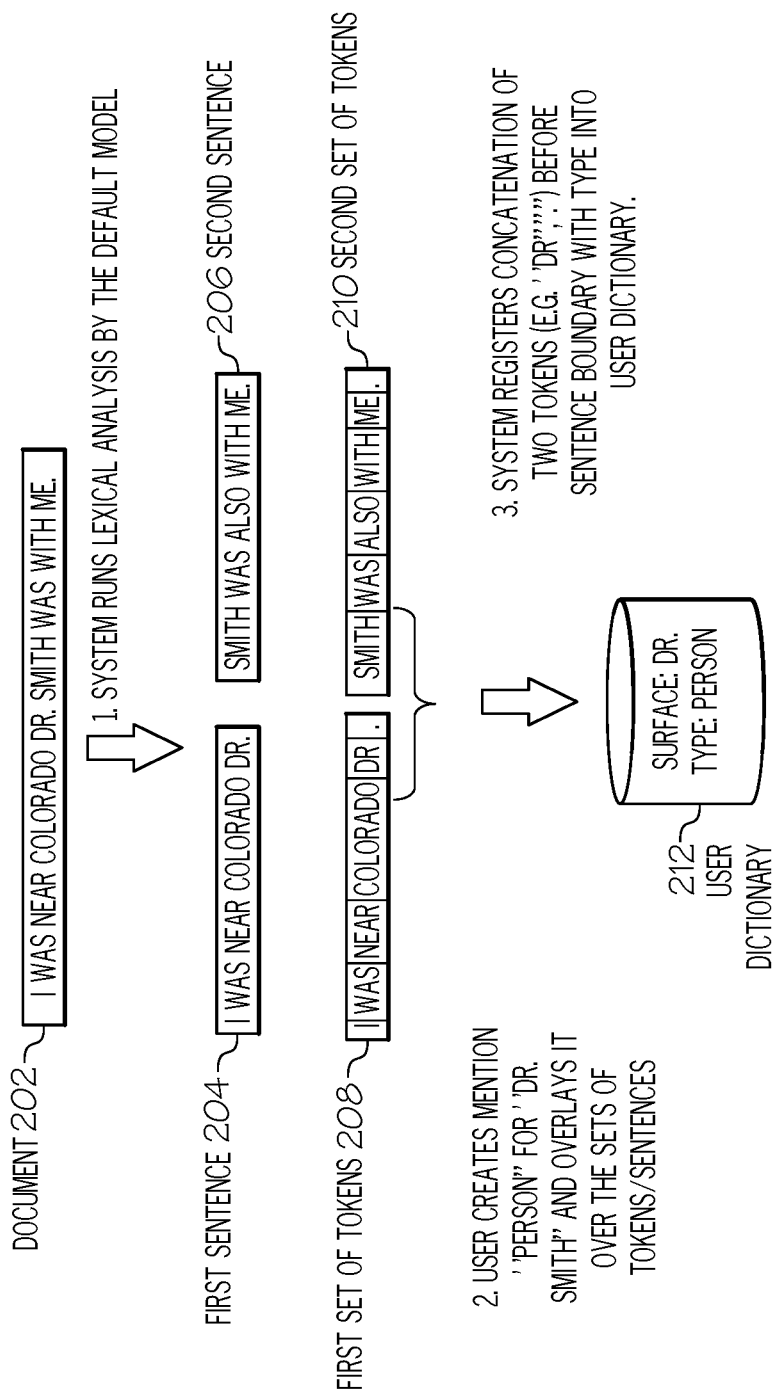
FIG. 2 depicts an exemplary registration of a mention in a user dictionary in accordance with one or more embodiments of the present invention.

With reference now to FIG. 2, an exemplary registration of a surface (i.e., one or more tokens) and type (of the one or more tokens) is presented.

Assume that an initial document 202 includes the words "I WAS NEAR COLORADO DR. SMITH WAS WITH ME." The system runs a standard lexical analysis using a default model that assumes that any period is the end of a sentence. This results in a first sentence 204 ("I WAS NEAR COLORADO DR.") and a second sentence 206 ("SMITH WAS ALSO WITH ME."). However, this might not have been what the document meant to say. That is, there may be a missing period after COLORADO. If so, and if the default model has a listing of abbreviations that ended in periods (e.g., Mr., Dr., etc.) that do not indicate the end of a sentence, then the first sentence 204 would actually read "I WAS NEAR COLORADO" and the second sentence 206 would actually read "DR. SMITH WAS ALSO WITH ME." However, the default model would not recognize this possibility.

As such, the present invention creates a mention "PERSON" to describe the surface (occurrence) of "DR. SMITH" in the document 202. This mention "PERSON" is able to not only transcend two sentences and their respective sets of tokens (e.g., the first set of tokens 208 from the first sentence 204 and the second set of tokens 210 from the second sentence 206), but also overrides punctuation (e.g., a period) that would contradict the mention "PERSON".

Thus, as shown in FIG. 2, once the mention "PERSON" is created, it is overlaid on "DR. SMITH". Furthermore, the system registers the concatenation of two tokens (e.g., "DR" and ".") found before the sentence boundary (between the first sentence 204 and the second sentence 206), along with the type of the mention ("PERSON") with the user dictionary 212 that is specific for a particular user.

Figure 3:
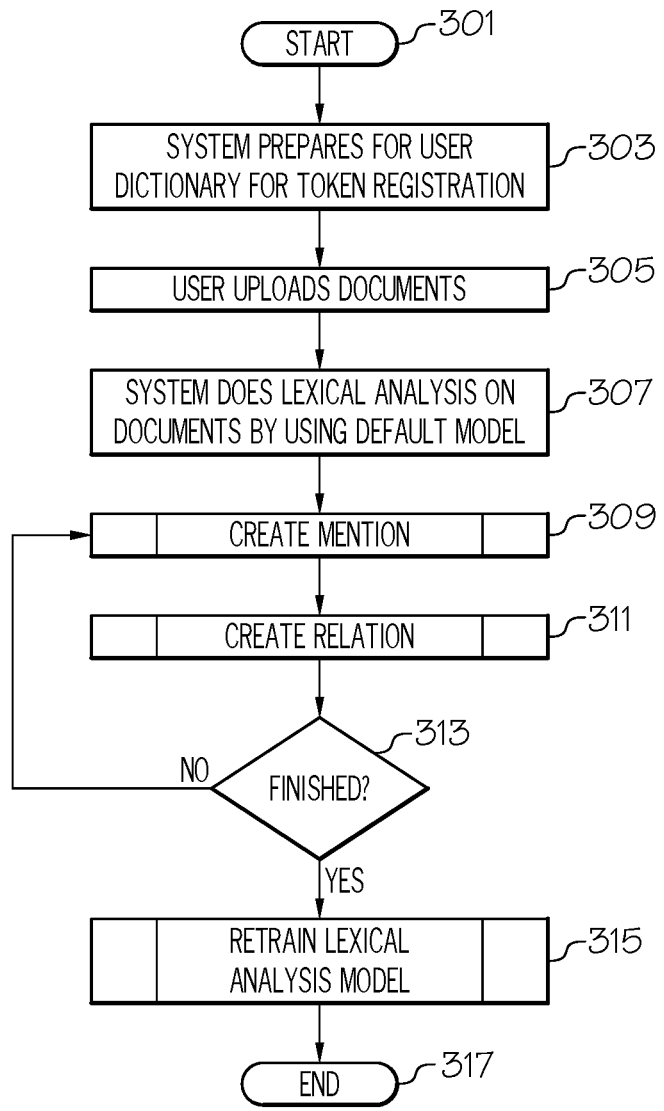
FIG. 3 is a high-level flow chart of one or more embodiments of the present invention.

With reference now to FIG. 3, a high-level flow-chart of one or more embodiments of the present invention is presented.

After initiator block 301, the system (e.g., computer 102 shown in FIG. 1) prepares a user dictionary (e.g., user dictionary 212 shown in FIG. 2) for token registration (including the registration of the token/surface type associated with a particular token/surface), as described in block 303.

As described in block 305, the system then uploads documents, such as the document 202 shown in FIG. 2.

As described in block 307, the system then performs a lexical analysis on the document(s) using a default model, as shown in FIG. 2.

As described in block 309, then system then creates a mention from the document. Additional detail of the operation depicted in block 309 is shown in FIG. 4.

Figure 4:
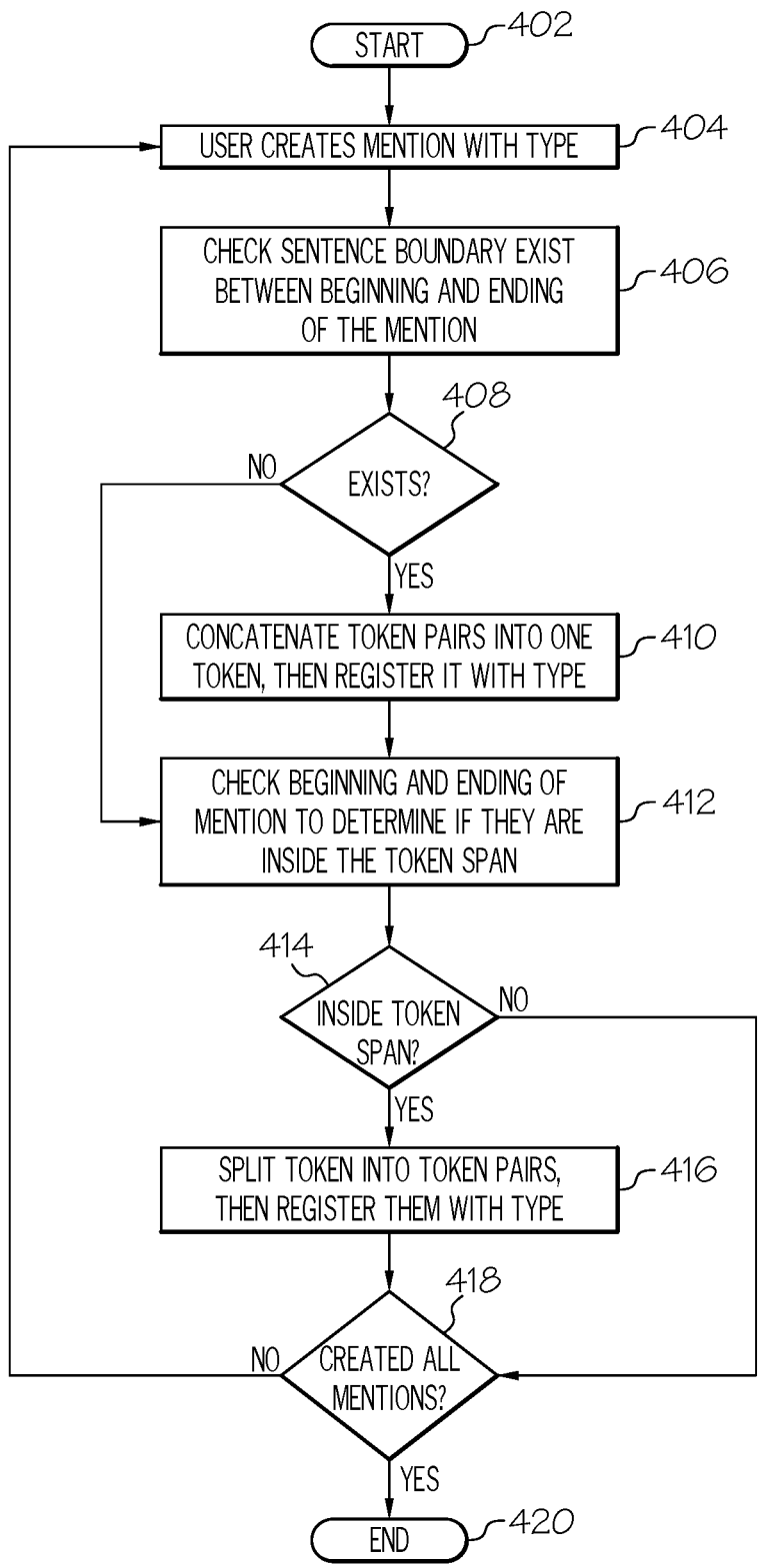
FIG. 4 is a high-level flow chart of a process for creating a mention in accordance with one or more embodiments of the present invention.

With reference now to FIG. 4, the process of creating a mention begins at initiator block 402.

As described in block 404, the user creates a mention (e.g., a term or phrase from the document) along with the type (e.g., "PERSON") of the mention.

As described in blocks 406-408, the system checks to see if a sentence boundary exists between the beginning and ending of the mention. For example, in FIG. 2, there is a sentence boundary between the beginning and ending of the mention "DR. SMITH".

As such, the system concatenates two or more token pairs into one token, and then registers it along with its type (block 410). Thus, in the example of "DR. SMITH", there are three tokens ("DR", ".", and "SMITH"), which are concatenated to form "DR. SMITH", which has the type "PERSON".

As described in block 412, the system then checks the beginning and ending of any mentions that are inside the token span. In the example shown in FIG. 2, the mention and the concatenated tokens are the same, and thus, the beginning and ending of the mention is inside the concatenated token's span. In other embodiments, however, the span of the mention can be greater or less than the span of the concatenated token's span. For example, assume that a mention "PERSON" describes "DR. SMITH, MD", and the token span covers "DR. SMITH". Thus, the span of the mention "PERSON" for "DR. SMITH, MD" is greater than the span of the token "DR. SMITH". However, assume now that a mention "PERSON" describes "DR. SMITH", and the token span covers "DR. SMITH, MD". Thus, the span of the mention "PERSON" for "DR. SMITH" is less than the span of the token "DR. SMITH, MD".

As such, assume that query block 414 determines that the beginning and ending of the mention is inside the span of the token (i.e., the span of the mention "PERSON" for "DR. SMITH" is less than the span of the token "DR. SMITH, MD"). As such, the token "DR. SMITH, MD" is then split into at least two token pairs (e.g., "DR. SMITH" and "MD"), as described in block 416. However, if the beginning and ending of the mention is not inside the span of the token (query block 414), then the token is not split.

As described in query block 418, a query is made to determine if all mentions needed for the document have been made. If not, then the process reiterates starting at block 404. If so, then the flow chart ends at terminator block 420.

Figure 5:
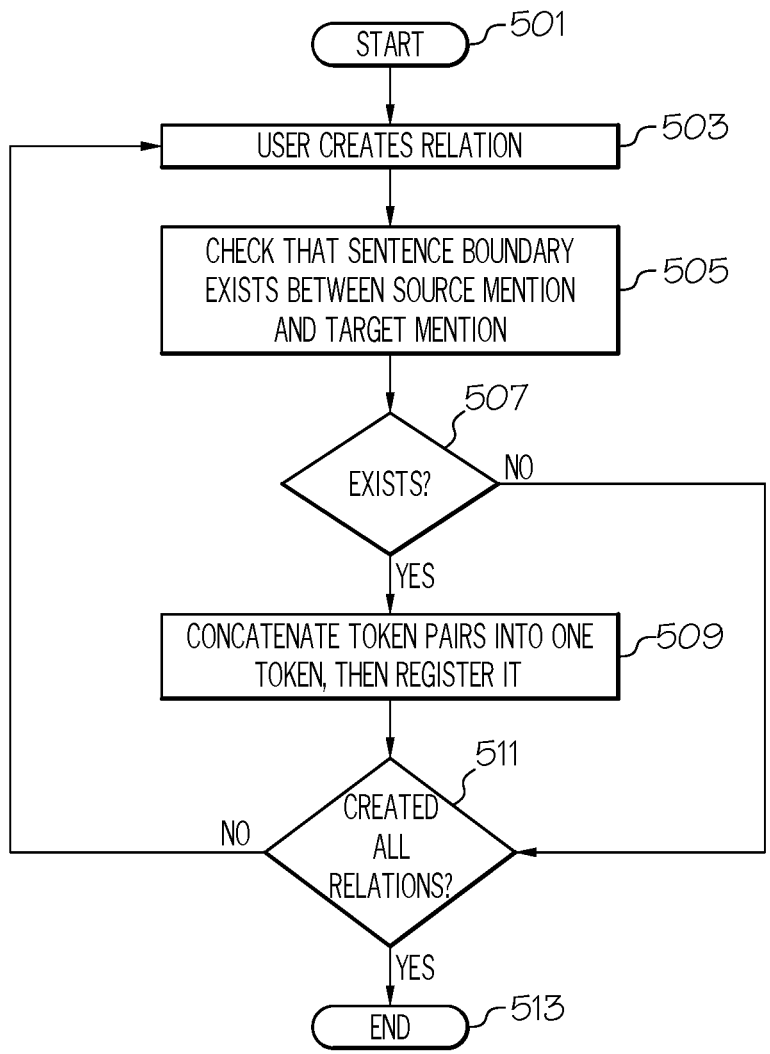
FIG. 5 is a high-level flow chart of a process for creating a relation in accordance with one or more embodiments of the present invention.

Returning to FIG. 3, the system then creates relations (i.e., the range of the two mentions in the document) between mentions in the document as shown in block 311. FIG. 5 presents additional detail of how relations are created.

With reference now to FIG. 5, the process of creating a relation begins at initiator block 501.

As described in block 503, a user creates an initial relation between two mentions.

As described in block 505, the system then checks to determine whether or not a sentence boundary exists between a source mention and a target mention. For example, a source mention in FIG. 2 for COLORADO DR. would be STREET, while a target mention for SMITH would be PERSON, since there is a sentence boundary between the first sentence 204 and the second sentence 206.

As such, (see query block 507), the system concatenates the tokens "DR" and "." and "SMITH" into one token, and registers "DR. SMITH" in the user dictionary 212 (see block 509).

Returning to query block 507, if there is not a sentence boundary between the source mention and the target mention, then a query is made to determine if all relations for mentions in the document have been created (block 511). The query in query block 511 is similarly performed after the token pairs are concatenated, as described in block 509.

If more relations need to be created (query block 511), then the process reiterates beginning at block 503. Otherwise, the flow chart ends at terminator block 513.

Returning to FIG. 3, a query is made in query block 313 as to whether all mentions and relations have been created for the document. If not, then the process reiteratively continues through the processes depicted in block 309 and block 311. However, if the creation of the mentions and relations has been completed for the document (query block 313), then the system retrains a lexical analysis model to identify and update tokens (block 315) and the process terminates at block 317. Additional detail of the process depicted in block 315 is shown in FIG. 6.

Figure 6:
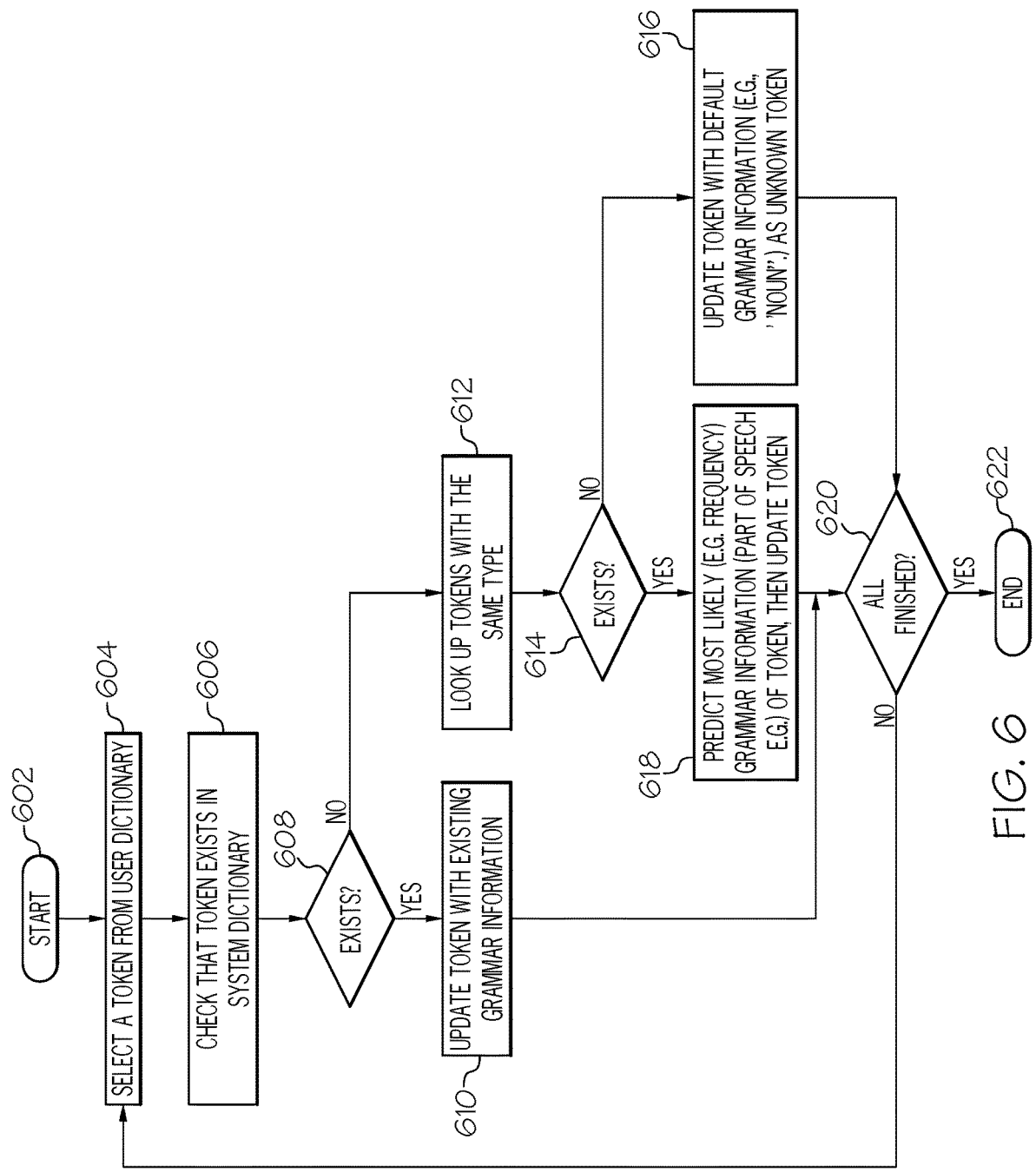
FIG. 6 is a high-level flow chart of a process for retraining a lexical analysis model in accordance with one or more embodiments of the present invention.

With reference to FIG. 6, the process for retraining the lexical analysis model begins at initiator block 602.

As described in block 604, the system selects a token from the user dictionary 212 shown in FIG. 2.

As described in block 606, the system checks to see if the selected token from the user dictionary already exists in the system dictionary (i.e., a standard term dictionary that is used by the system for analyzing documents).

If the selected token from the user dictionary already exists in the system dictionary (query block 608), then the selected token is updated with existing grammar information (e.g., part of speech, definition (mention), etc.) from the system dictionary (block 610).

However, if the selected token from the user dictionary does not already exist in the system dictionary (query block 608), then the system looks up tokens in the document that have the same type (e.g., "PERSON") (block 612). If such a token exists (query block 614), then the system predicts what the most likely part of speech, definition, etc. of the selected token is, and updates it accordingly (block 618). However, if such an existing token in the document does not exist (such that the definition, mention, part of speech, etc. is unknown), then the selected (unknown type) token is updated with default grammar information, such as "NOUN" (block 616).

A query is made in query block 620 to see if all tokens in the document have been evaluated, thus leading to the retraining of the lexical analysis model. If not, then the process reiteratively returns to perform the described processes beginning at block 604. Otherwise, the flow chart ends at terminator block 622.

In one or more embodiments of the present invention, a Recurrent Neural Network (RNN) is utilized as the lexical analysis model and the retraining thereof.

As the name implies, an RNN is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected other biological neurons.

An electronic neural network similarly is made up of electronic neurons. However, unlike biological neurons, electronic neurons are never technically "inhibitory", but are only "excitatory" to varying degrees.

Figure 7:
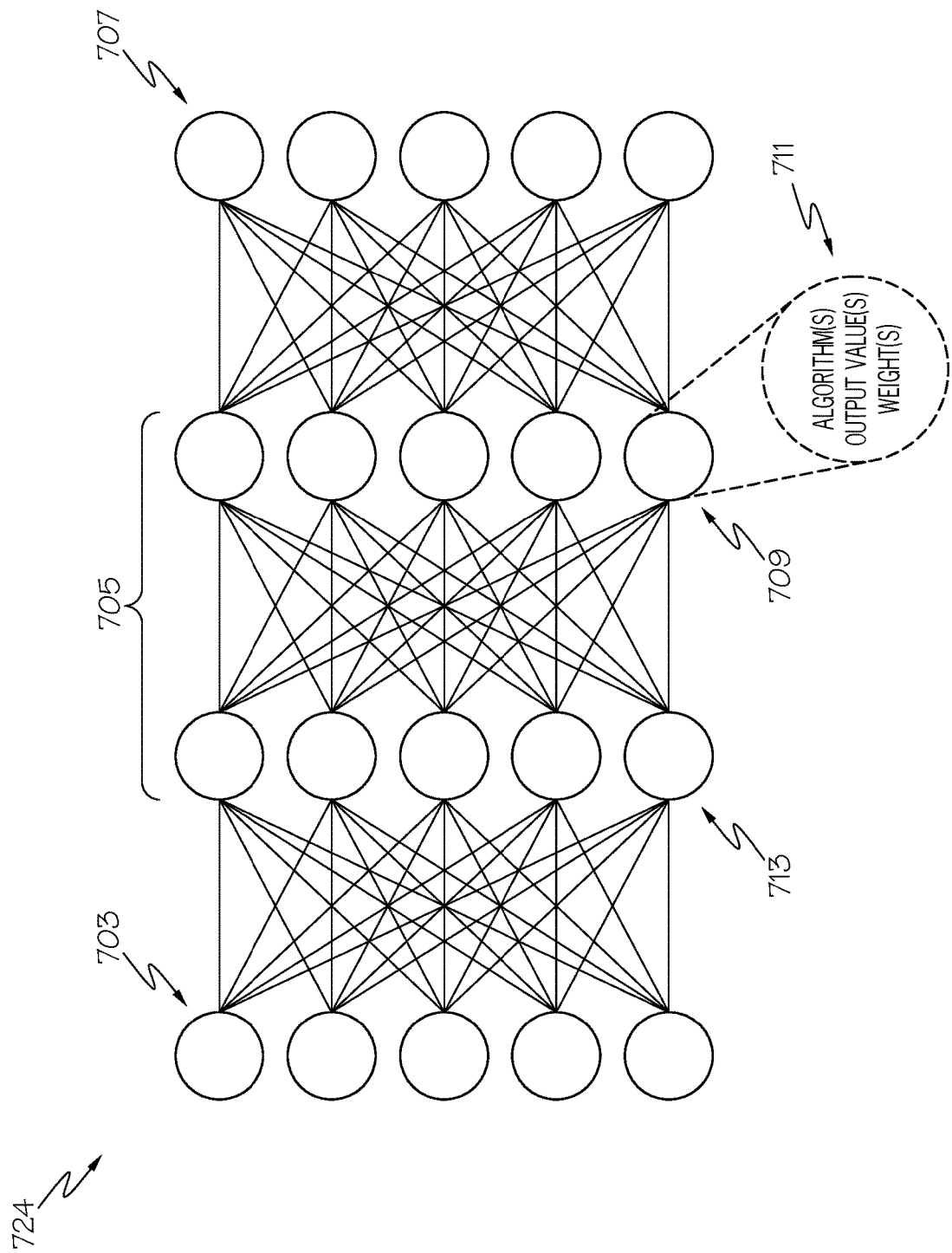
FIG. 7 illustrates an exemplary recurrent neural network (RNN) as used in one or more embodiments of the present invention.

With reference now to FIG. 7, an exemplary recurrent neural network (RNN) 724 (analogous to RNN 124 shown in FIG. 1) as used in one or more embodiments of the present invention is presented.

In an RNN such as RNN 724, neurons are arranged in layers, known as an input layer 703, hidden layers 705, and an output layer 707. The input layer 703 includes neurons/nodes that take input data, and send it to a series of hidden layers of neurons (e.g., hidden layers 705), in which all neurons from one layer in the hidden layers are interconnected with all neurons in a next layer in the hidden layers 705. The final layer in the hidden layers 705 then outputs a computational result to the output layer 707, which is often a single node for holding vector information.

As just mentioned, each node in the depicted RNN 724 represents an electronic neuron, such as the depicted neuron 709. As shown in block 711, each neuron (including neuron 709) functionally includes at least three features: an algorithm, an output value, and a weight.

The algorithm is a mathematic formula for processing data from one or more upstream neurons. For example, assume that one or more of the neurons depicted in the middle hidden layers 705 send data values to neuron 709. Neuron 709 then processes these data values by executing the algorithm shown in block 711, in order to create one or more output values, which are then sent to another neuron, such as another neuron within the hidden layers 705 or a neuron in the output layer 707. Each neuron also has a weight that is specific for that neuron and/or for other connected neurons.

For example, assume that neuron 713 is sending the results of its analysis of a piece of data to neuron 709. Neuron 709 has a first weight that defines how important data coming specifically from neuron 713 is. If the data is important, then data coming from neuron 713 is weighted heavily, thus causing the algorithm(s) within neuron 709 to generate a higher output, which will have a heavier impact on neurons in the output layer 707. Similarly, if neuron 713 has been determined to be significant to the operations of neuron 709, then the weight in neuron 713 will be increased, such that neuron 709 receives a higher value for the output of the algorithm in the neuron 713. These weights are adjustable for one, more, or all of the neurons in the RNN 724, such that a reliable output will result from output layer 707. Such adjustments may be performed manually or automatically.

When manually adjusted, the weights are adjusted by the user, sensor logic, etc. in a repeated manner until the output from output layer 707 matches expectations. For example, assume that input layer 703 receives tokens from document 202 (see FIG. 2). If the output from output layer 707 is a vector that is predetermined to describe a certain mention, type, etc., then the weights (and alternatively the algorithms) are adjusted until the vector generated by output layer 707 has a value that is associated with the appropriate mention, type, etc. for the token(s) in the document.

When automatically adjusted, the weights (and/or algorithms) are adjusted using "back propagation", in which weight values of the neurons are adjusted by using a "gradient descent" method that determines which direction each weight value should be adjusted to. This gradient descent process moves the weight in each neuron in a certain direction until the output from output layer 707 improves (e.g., gets closer to representing a certain mention, type, etc.).

Figure 8:
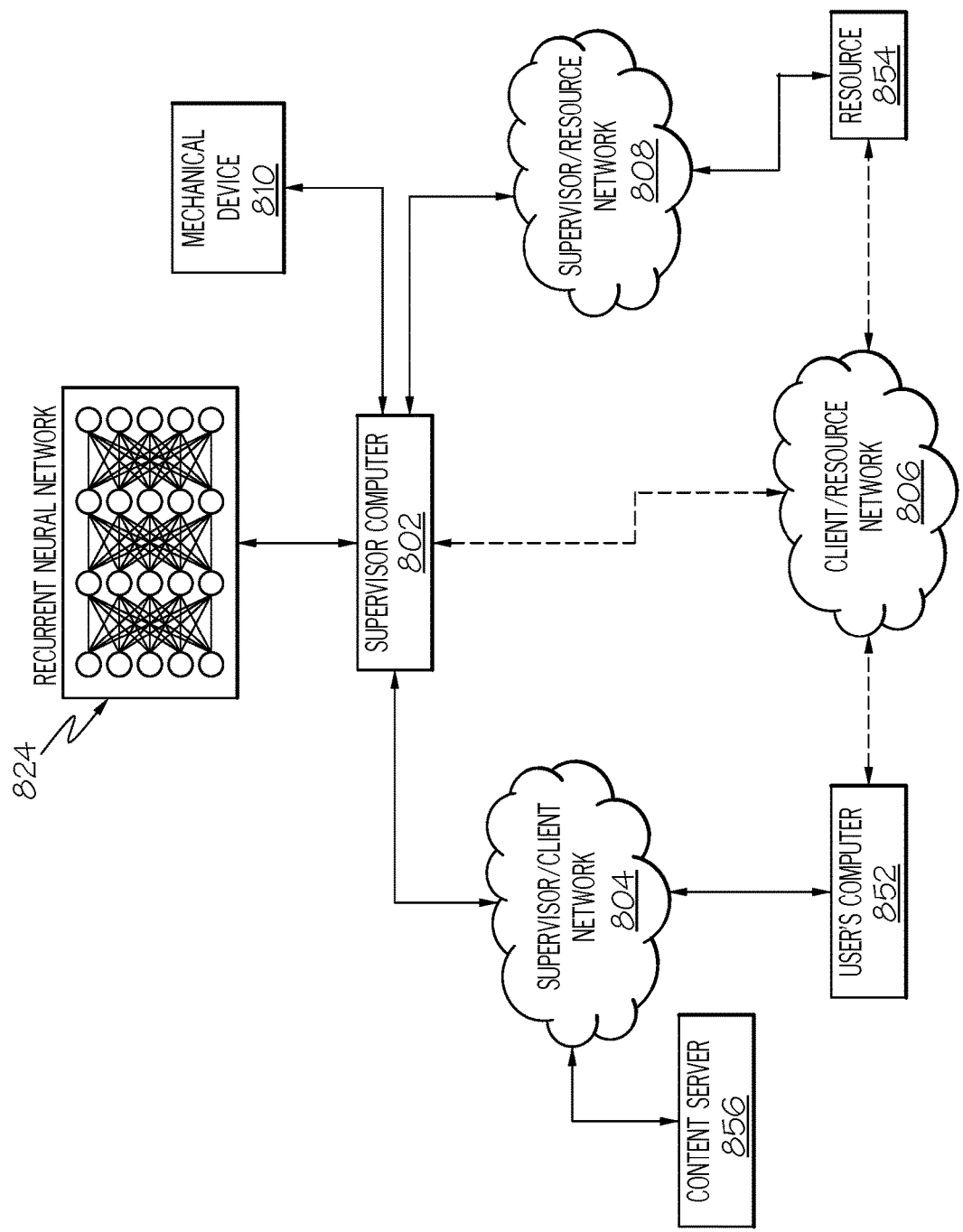
FIG. 8 depicts an overview of an architecture utilized in one or more embodiments of the present invention.

With reference now to FIG. 8, an overview of an architecture utilized in one or more embodiments of the present invention is presented.

As shown in FIG. 8, a supervisor computer 802 (analogous to computer 102 shown in FIG. 1) is coupled to a content server 856 (analogous to content server 156 shown in FIG. 1) and a user's computer 852 (analogous to user's computer 152 shown in FIG. 1) via a first supervisor/client network 804, which is neither connected to a supervisor/resource network 808 (which connects the supervisor computer 802 to a resource 854 (analogous to resource 154 shown in FIG. 1) nor a client/resource network 806.

Supervisor computer 802 receives content from content server 856 (e.g., from multiple posters of content onto a social media website) and/or from the user's computer 852 (e.g., an individual poster of content). Supervisor computer 802 generates mentions, relations, etc. as described herein for the received content (documents). When using the RNN 824 (analogous to the RNN 724 depicted in FIG. 7), the supervisor computer 802 applies token inputs to the RNN 824 in order to train the RNN 824 to take such tokens from the documents to define the mentions, relations, etc.

Furthermore, in one or more embodiments of the present invention, the RNN 824, which is a lexical analysis model for analyzing documents as described herein, is re-trained to take subsequent updated relations, mentions, etc. in order to update the configuration of the RNN 824. That is, the RNN 824 is initially configured to divide a document up into sentences and tokens, and to create mentions, types, and relations for such tokens, as described above. Thereafter, as additional tokens are input into the RNN 824, the RNN 824 "learns" (by adjusting neuron weights, algorithms, etc.) how to identify other mentions, relations, etc. for these additional tokens, as well as determining how accurate the mentions, relations, etc. are for previously known tokens.

Once the supervisor computer 802 trains the RNN 824 how to recognize mentions, types, relations, etc., it activates a resource that will accommodate the author of the content.

In an embodiment, the present invention activates a mechanical device that accommodates the newly determined mention/relationship. For example, assume that the supervisor computer detects that the content of the document being analyzed has a token "LO-LOAD". The system creates a mention for "LO-LOAD" that describes it as a pump that is inadequate for a job described in the document. As such, supervisor computer 802 will bring other pumps (examples of mechanical device 810) online (i.e., will activate/turn on the other pumps), since RNN 824 has provided an output (based on the document) that lets the supervisor computer 802 know that the mechanical device 810 needs to be turn on. In another embodiment, the pump is left online, but it adjusted (e.g., sped up), in order to meet the demands of the system as described in the email sent from the user's computer 852 to the supervisor computer 802.

In an embodiment of the present invention, the supervisor computer 802 activates a client/resource network 806 that allows the user's computer 852 to communicate with the resource 854 when a certain mention/relation for tokens in the document are developed by the RNN 824. For example, assume that the user of user's computer 852 sends an email to supervisor computer 802 saying "I need LO-RUN to be faster". Based on the creation of a mention that identifies "LO-RUN" as being a slow computer, the supervisor computer 402 activates the previously turned off client/resource network 806, which allows the resource 854 to send a software patch to the user's computer 852 (making the user's computer 852 faster), and/or allows the user's computer 852 to offload some routine processing operations to resource 854 (which is a computer in one or more embodiments of the present invention), etc. That is, only by selectively activating the client/resource network 806 can the user's computer 852 now receive the services and/or software needed to improve the operations of user's computer 852, and client/resource network 806 is only activated in response to supervisor computer 802 receiving an output form the RNN 824 indicating that the email sent from the user's computer 852 includes a mention of "SLOW COMPUTER".

Figure 9:
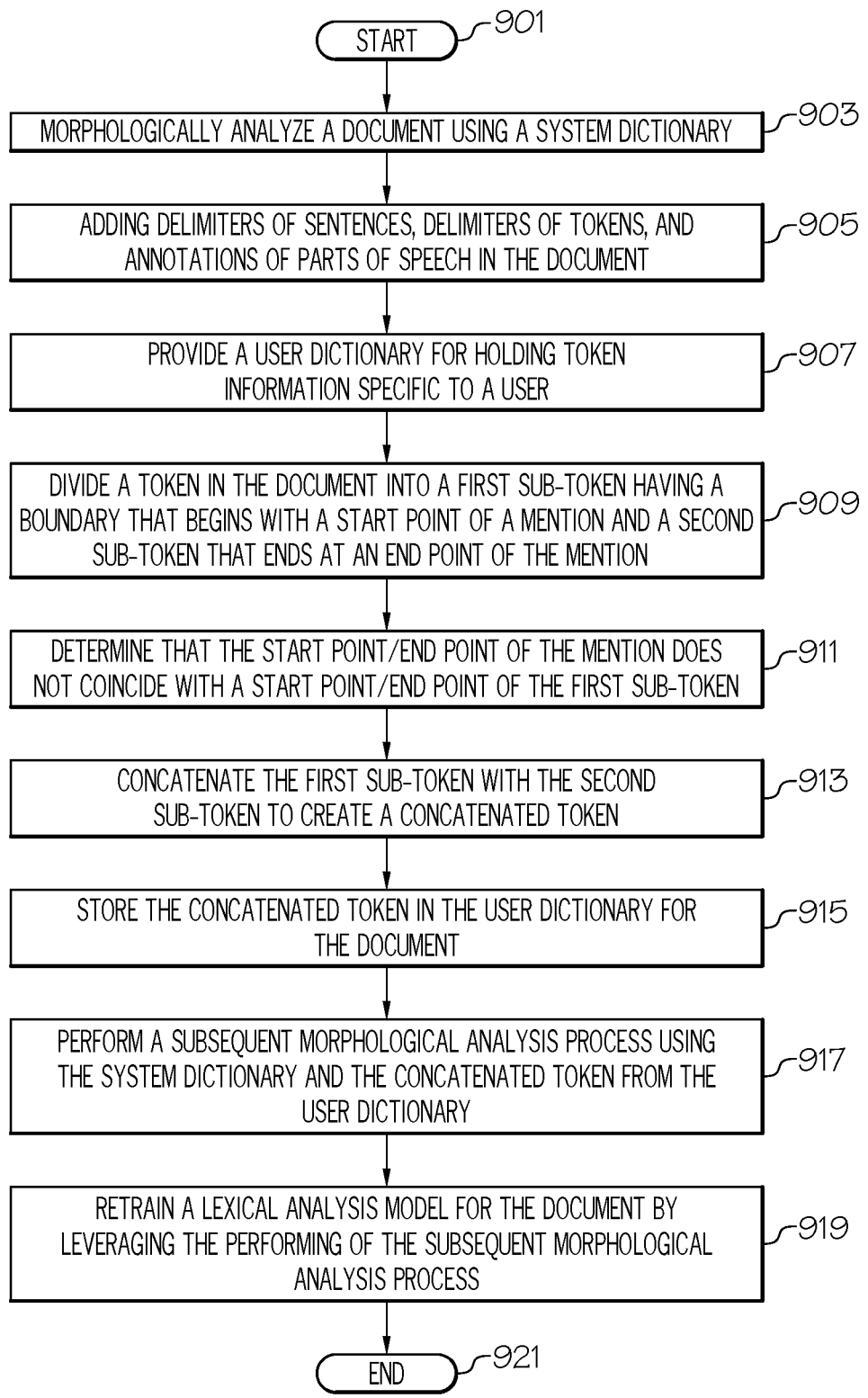
FIG. 9 is a high-level flow chart of one or more steps performed in accordance with one or more embodiments of the present invention.

With reference now to FIG. 9, a high-level flow chart of processes performed in one or more embodiments of the present invention is presented.

After initiator block 901, a supervisor computer (e.g., supervisor computer 802 shown in FIG. 8)morphologically analyzes a document using a system dictionary, as described in block 903 and shown in Step 1 in FIG. 2.

As described in block 905, the supervisor computer adds delimiters of sentences, delimiters of tokens, and annotations of parts of speech into the document.

The supervisor computer then changes a result of the morphological analysis of the document through an annotating operation, which includes the processes depicted in blocks 907-915.

As depicted in block 907, the supervisor computer provides a user dictionary (e.g., user dictionary 212 shown in FIG. 2) for holding token information specific to a user.

As described in block 909, the supervisor computer divides a token in the document (e.g., "DR. SMITH" shown in FIG. 2) into a first sub-token (e.g., "DR.") having a boundary that begins with a start point of a mention (e.g., "PERSON") and a second sub-token (e.g., "SMITH") that ends at an end point of the mention.

As described in block 911, the supervisor computer determines that the start point/end point of the mention does not coincide with a start point/end point of the first sub-token.

As described in block 913, the supervisor computer, in response to determining that the start point/end point of the mention does not coincide with the start point/end point of the first sub-token, concatenates the first sub-token with the second sub-token to create a concatenated token (e.g., "DR. SMITH").

As described in block 915, the supervisor computer then stores the concatenated token in the user dictionary for the document.

As described in block 917, the supervisor computer then performs a subsequent morphological analysis process using the system dictionary and the concatenated token from the user dictionary. That is, information from both the generic system dictionary as well as the concatenated token from the user dictionary are used to analyze the document by creating mentions/relations for the newly-concatenated token.

As described in block 919, the supervisor computer then retrains a lexical analysis model (e.g., RNN 724 shown in FIG. 7) for the document by leveraging the performing of the subsequent morphological analysis process. That is, inputting the newly-concatenated token into the lexical analysis model (e.g., RNN 724) causes the RNN 724 to be retrained/modified, in order to better create mentions/relations for the token in user documents.

The flow chart ends at terminator block 921.

In an embodiment of the present invention, the supervisor computer determines that a sentence delimiter intervenes between two mentions for the document. In response to determining that the sentence delimiter intervenes between two mentions for the document, the system registers, as a pair, tokens before and after the sentence delimiter during creation of a relation.

In an embodiment of the present invention, the morphological analysis includes splitting the document into multiple phrases, tokenizing the multiple phrases, and tagging each token for the multiple phrases with a part-of-speech tag.

In an embodiment of the present invention, each token associated with the document is defined as a minimum unit of configuration elements of a sentence, where the configuration elements are obtained as a result of the morphological analysis, and where each token has positional information that describes where each token begins and ends in the document.

In an embodiment of the present invention, the type is defined as a label that is created by a user and serves as a detection target in machine learning.

In an embodiment of the present invention, the mention is defined as an annotation of the token that is created by the user, the mention has positional information that describes where the mention begins and ends in the document, and the mention includes information that describes the type of the token.

In an embodiment of the present invention, wherein the relation is defined as an annotation of the token that is created by the user, and the relation describes the type of the mention.

In an embodiment of the present invention, the lexical analysis model is modeled in a recurrent neural network (RNN). In this embodiment, the method further includes the supervisor computer inputting the concatenated token into the RNN in order to perform the subsequent morphological analysis process.

In an embodiment of the present invention, the supervisor computer determines that the subsequent morphological analysis process using the RNN fails to accurately describe the document, and adjusts neurons in the RNN until the subsequent analysis process using the RNN accurately describes the document. (See FIG. 7.)

In an embodiment of the present invention, the document describes an operation of a mechanical device, and the method further includes: in response to performing the subsequent morphological analysis process using the system dictionary and the concatenated token from the user dictionary, determining, by the supervisor computer, that the document states that the mechanical device is functioning improperly; and in response to determining that the document states that the mechanical device is functioning improperly, adjusting, by the supervisor computer, an operation of the mechanical system until the mechanical system is functioning properly.

In an embodiment of the present invention, the document describes a need of the user, and the method further includes: in response to performing the subsequent morphological analysis process using the system dictionary and the concatenated token from the user dictionary, determining, by the supervisor computer, that the document states that the user needs a particular software application to be activated; and in response to determining that the use needs a particular software application to be activated, activating, by the supervisor computer, the particular software application in order to meet the need of the user. (See FIG. 8.)

In an embodiment of the present invention, the supervisor computer presents a link to the software application to a client computer (e.g., user's computer 852 shown in FIG. 8) that is used by the user; receives an activation signal of the link from the client computer; and transmits and activates the software application in the client computer in response to receiving the activation signal of the link from the client computer. (See FIG. 8.)

Thus, one or more embodiments of the present invention utilize concatenation of tokens and division of tokens.

Concatenation of Tokens

Concatenation of tokens enables the system to put a mention inside of a sentence. For example, assume that the user inputs a text: "WHEN I WAS NEAR COLORADO, DR. SMITH WAS WITH ME.". This sentence is separated into two sentences (s1, s2) and sets of tokens by a morphological analysis process:

(s1) "WHEN I WAS NEAR COLORADO, DR." (tokens: "WHEN", "I", "WAS", "NEAR", "COLORADO", ",", "DR", ".")

(s2) "SMITH WAS WITH ME." (tokens: "SMITH", "WAS", "WITH", "ME", ".")

Next, the user creates a mention (annotation) on "DR. SMITH" of the type "PERSON". However, a mention should not exist over a sentence boundary. Therefore, the system concatenates two tokens ("Dr", ".") into a single token ("Dr."), and then registers the concatenated token into the user dictionary.

In a preferred embodiment of the present invention, all tokens (e.g., "DR", ".", "SMITH") that are covered by a mention are NOT concatenated into one token ("DR. SMITH").

Thus, in the present invention, the last and penultimate tokens before the sentence delimiter are concatenated.

In one or more embodiments, the present invention performs a similar operation for relations. That is, concatenation of tokens aims at putting a relation inside a sentence, too.

As such, a relation is created on two mentions: a source mention and a target mention. If there is a sentence boundary between the source mention and the target mention, then the last and penultimate tokens before the sentence boundary are concatenated into a single token, then that single token is registered with type "PERSON" into the user dictionary.

Division of Tokens

A division of tokens aims at ensuring that both the beginning and the ending of a mention do not exist inside spans of any tokens.

For example, assume that the user inputs the text "New York-Munich Flights (NYC-MUC) from US$626" for a flight reservation. This text is separated into eleven tokens by a morphological analysis process ("New", "York", "-", "Munich", "Flights", "(", "NYC-MUC", ")", "from", "US$", "626").

Next, the user creates mentions on "NYC", "MUC" with type "AIRCODE". The beginning and the end of mentions should not exist inside spans of any tokens. Therefore, the system divides a token ("NYC-MUC") into tokens ("NYC", "-", "MUC"), and then registers a token ("-") into the user dictionary, and also registers the tokens ("NYC", "MUC") with type "AIRCODE" into the user dictionary.

Figure 10:
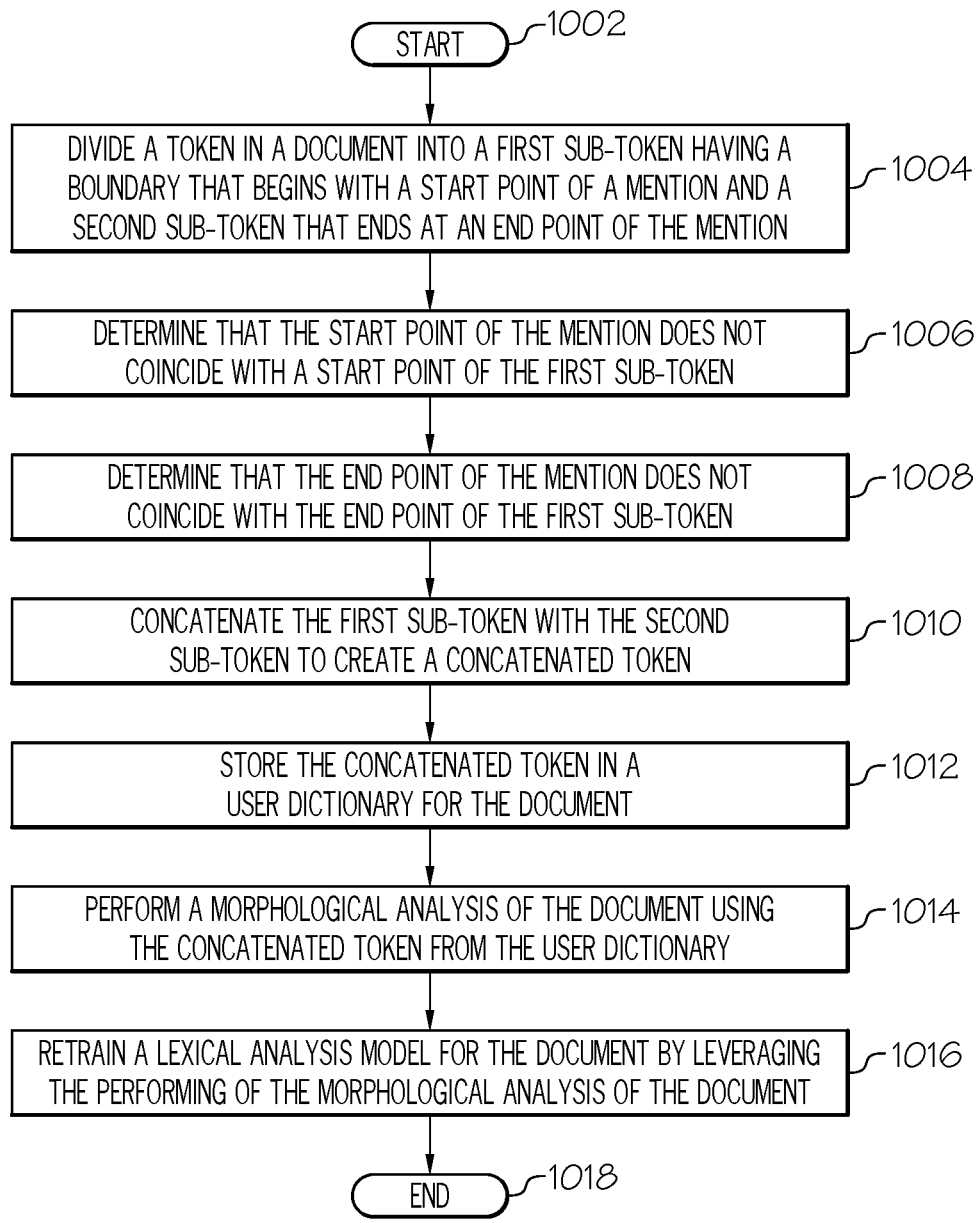
FIG. 10 is another high-level flow chart of one or more steps performed in accordance with one or more embodiments of the present invention.

With reference then to FIG. 10, a high-level overview of one or more embodiments of the present invention using the process just described is presented.

After initiator block 1002, one or more processors (e.g., processor 104 shown in FIG. 1) divide a token (e.g., "NYC-MUC") in a document into a first sub-token (e.g., "NYC") having a boundary that begins with a start point of a mention (e.g., "AIRCODE") and a second sub-token (e.g., "MUC") that ends at an end point of the mention, as depicted in block 1004.

As described in block 1006, the processor(s) determine that the start point of the mention does not coincide with a start point of the first sub-token.

As described in block 1008, the processor(s) determine that the end point of the mention does not coincide with the end point of the first sub-token.

As described in block 1010, the processor(s), in response to determining that the start point of the mention does not coincide with the start point of the first sub-token and that the end point of the mention does not coincide with the end point of the first sub-token, concatenate the first sub-token with the second sub-token to create a concatenated token.

As described in block 1012, the processor(s) store the concatenated token in a user dictionary for the document.

As described in block 1014, the processor(s) perform a morphological analysis of the document using the concatenated token from the user dictionary. That is, using the morphological analysis process described herein, the text is interpreted as including the concatenated token to represent a single entity/concept/etc. This enables the system to, as described in block 1016, to retrain a lexical analysis model for the document (see FIGS. 7-8) by leveraging the performing of the morphological analysis of the document.

The flow chart ends at terminator block 1018.

Figure 11:
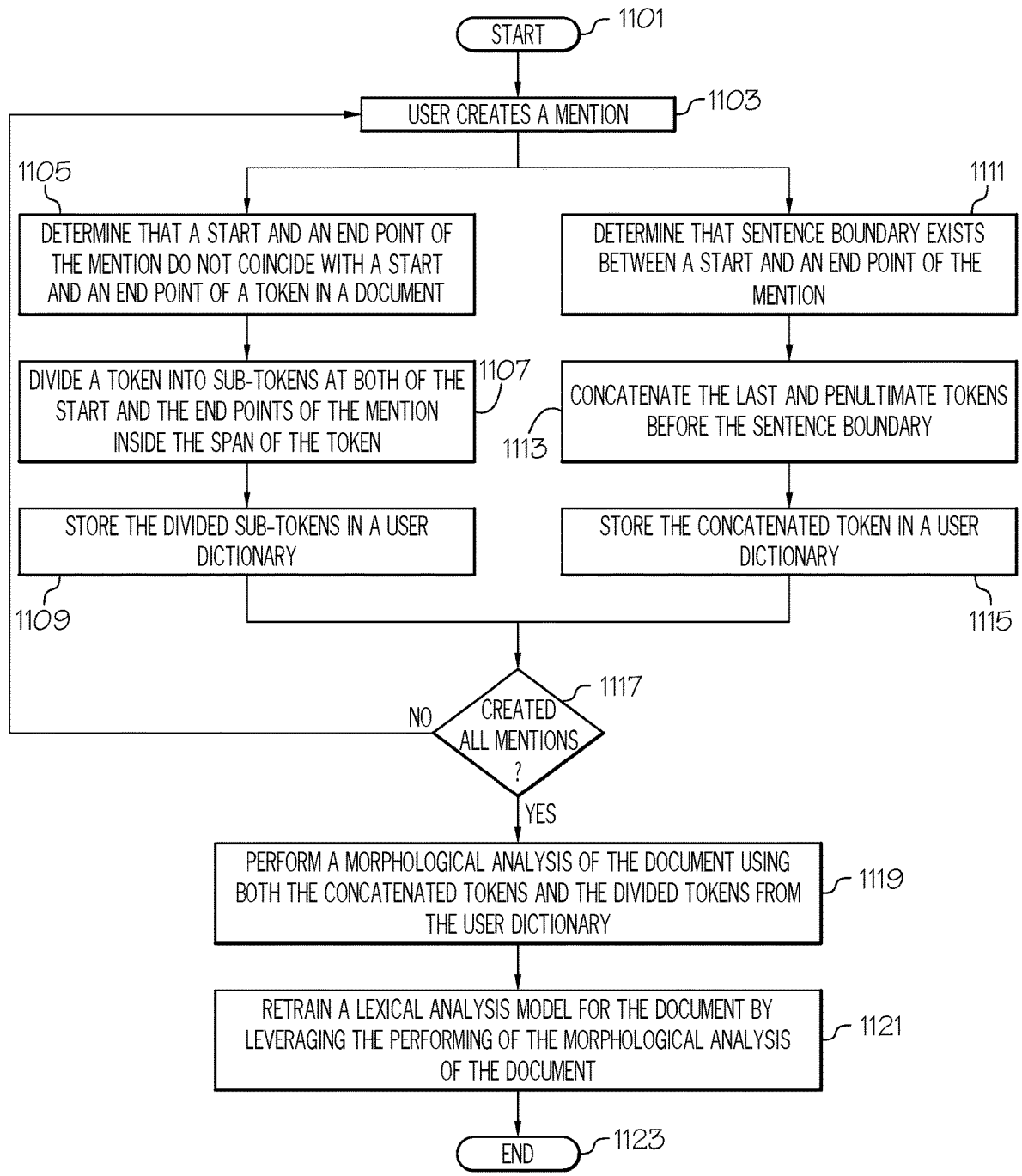
FIG. 11 is another high-level flow chart of one or more steps performed in accordance with one or more embodiments of the present invention.

With reference now to FIG. 11, another embodiment/explanation of the present invention is presented, clarifying that the divisions and concatenation operations of the present invention are preferably separate operations.

Thus, after initiator block 1101, a user creates a mention, as depicted in block 1103. After this operation, the invention takes the steps of division (blocks 1105-1109) and concatenation (blocks 1111-1115).

Thus, as depicted in block 1105, the user (and/or system) determines that start point and an end point of the mention do not coincide with the start and an end points of a token in a document.

As depicted in block 1107, the user (and/or system) then divides the token into sub-tokens at both of the start and the end points of the mention inside the span of the token.

As depicted in block 1109, the user (and/or system) stores the divided sub-tokens in a user dictionary.

With reference now to block 1111, the system (and/or user) determines that sentence boundary exists between start and end points of the mention.

As depicted in block 1113, the user (and/or system) concatenates the last and penultimate tokens before the sentence boundary.

As depicted in block 1115, the user (and/or system) then stores the concatenated token(s) in a user dictionary.

The user (and/or system) then makes a query as to whether all mentions have been created for the document (query block 1117). If not, then the process reiterative returns to block 1103 until all mentions have been created. However, if all mentions for the document have been created, then the user (and/or system) performs a morphological analysis of the document using both the concatenated tokens and the divided tokens from the user dictionary, as depicted in block 1119.

As depicted in block 1121, the user (and/or system) retrains a lexical analysis model for the document by leveraging the performing of the morphological analysis of the document.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 12:
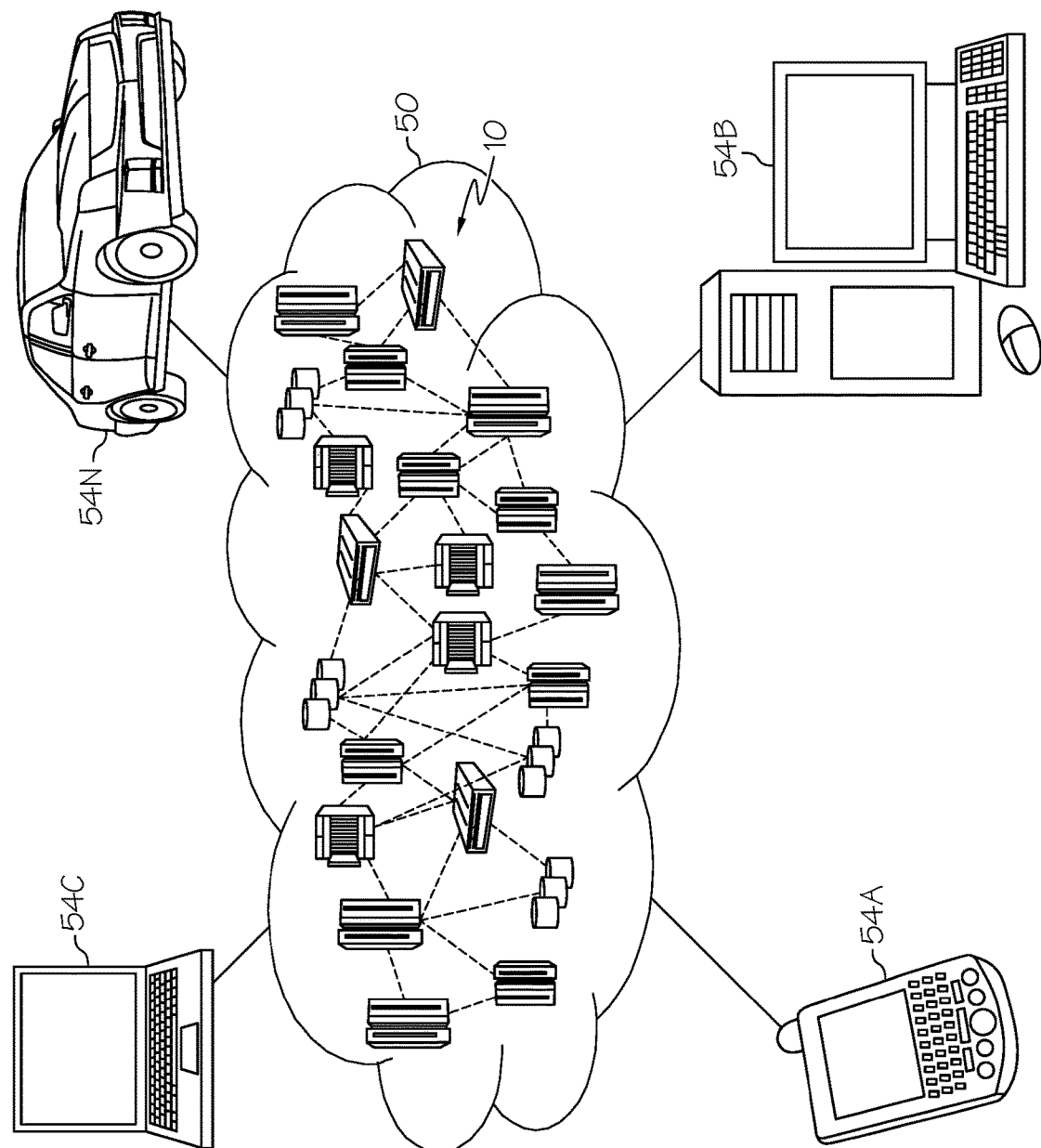
FIG. 12 depicts a cloud computing environment according to an embodiment of the present invention.

Referring now to FIG. 12 illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 11 are intended to be illustrative only and that computing nodes 10 and cloud computing environment 50 can communicate with any type of computerized device over any type of network and/or network addressable connection (e.g., using a web browser).

Figure 13:
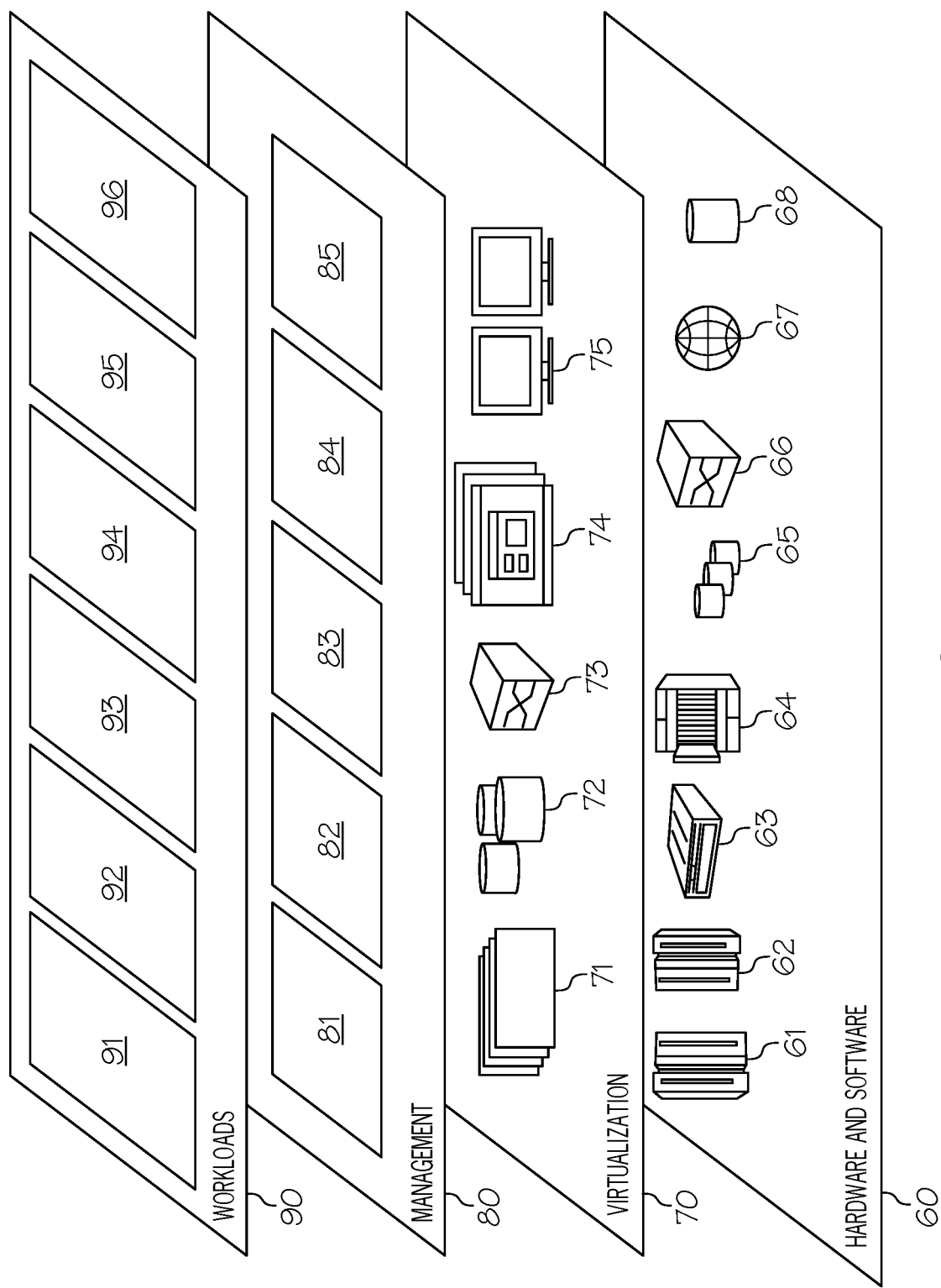
FIG. 13 depicts abstraction model layers of a cloud computer environment according to an embodiment of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and text morphological analysis processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present invention are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   morphologically analyzing, by a supervisor computer, a document using a system dictionary,
   adding, by the supervisor computer, delimiters of sentences, delimiters of tokens, and annotations of parts of speech in the document;
   changing, by the supervisor computer, a result of the morphological analysis of the document through an annotating operation, wherein the annotating operation comprises:
      providing, by the supervisor computer, a user dictionary for holding token information specific to a user;
      dividing, by the supervisor computer, a token in the document into a first sub-token having a boundary that begins with a start point of a mention and a second sub-token that ends at an end point of the mention;
      determining, by the supervisor computer, that the start point/end point of the mention does not coincide with a start point/end point of the first sub-token;
      in response to determining that the start point/end point of the mention does not coincide with the start point/end point of the first sub-token, concatenating, by the supervisor computer, the first sub-token with the second sub-token to create a concatenated token; and
      storing, by the supervisor computer, the concatenated token in the user dictionary for the document;
   performing, by the supervisor computer, a subsequent morphological analysis process using the system dictionary and the concatenated token from the user dictionary;
   modifying, by the supervisor computer, a lexical analysis model for the document by leveraging the performing of the subsequent morphological analysis process, wherein the lexical analysis model is modeled in a recurrent neural network (RNN); and
   inputting, by the supervisor computer, the concatenated token into the RNN in order to perform the subsequent morphological analysis process.

2. The method of claim 1, further comprising:
   determining, by the supervisor computer, that a sentence delimiter intervenes between two mentions for the document; and
   in response to determining that the sentence delimiter intervenes between two mentions for the document, registering, as a pair, tokens before and after the sentence delimiter during creation of a relation.

3. The method of claim 1, wherein the morphological analysis comprises splitting the document into multiple phrases, tokenizing the multiple phrases, and tagging each token for the multiple phrases with a part-of-speech tag.

4. The method of claim 1, wherein each token associated with the document is defined as a minimum unit of configuration elements of a sentence, wherein the configuration elements are obtained as a result of the morphological analysis, and wherein said each token has positional information that describes where said each token begins and ends in the document.

5. The method of claim 1, wherein the type is defined as a label that is created by a user and serves as a detection target in machine learning.

6. The method of claim 1, wherein the mention is defined as an annotation of the token that is created by the user, wherein the mention has positional information that describes where the mention begins and ends in the document, and wherein the mention includes information that describes the type of the token.

7. The method of claim 2, wherein the relation is defined as an annotation of the token that is created by the user, wherein the relation describes the type of the mention.

8. The method of claim 1, further comprising:
determining, by the supervisor computer, that the subsequent morphological analysis process using the RNN fails to accurately describe the document; and
adjusting, by the supervisor computer, neurons in the RNN until the subsequent analysis process using the RNN accurately describes the document.

9. A computer program product comprising a computer readable storage medium having program code embodied therewith, wherein the computer readable storage medium is not a transitory signal per se, and wherein the program code is readable and executable by a processor to perform a method comprising:
morphologically analyzing a document using a system dictionary, wherein the document describes an operation of a mechanical device,
adding delimiters of sentences, delimiters of tokens, and annotations of parts of speech in the document;
changing a result of the morphological analysis of the document through an annotating operation, wherein the annotating operation comprises:
providing a user dictionary for holding token information specific to a user;
dividing a token in the document into a first sub-token having a boundary that begins with a start point of a mention and a second sub-token that ends at an end point of the mention;
determining that the start point/end point of the mention does not coincide with a start point/end point of the first sub-token;
in response to determining that the start point/end point of the mention does not coincide with the start point/end point of the first sub-token, concatenating the first sub-token with the second sub-token to create a concatenated token; and
storing the concatenated token in the user dictionary for the document;
performing a subsequent morphological analysis process using the system dictionary and the concatenated token from the user dictionary;
modifying a lexical analysis model for the document by leveraging the performing of the subsequent morphological analysis process;
in response to performing the subsequent morphological analysis process using the system dictionary and the concatenated token from the user dictionary, determining that the document states that the mechanical device is functioning improperly; and
in response to determining that the document states that the mechanical device is functioning improperly, adjusting an operation of the mechanical system until the mechanical system is functioning properly.

10. The computer program product of claim 9, wherein the method further comprises:
determining that a sentence delimiter intervenes between two mentions for the document; and
in response to determining that the sentence delimiter intervenes between two mentions for the document, registering, as a pair, tokens before and after the sentence delimiter during creation of a relation, wherein the relation is defined as an annotation of the token that is created by the user, and wherein the relation describes the type of the mention.

11. The computer program product of claim 9, wherein the lexical analysis model is modeled in a recurrent neural network (RNN), and wherein the method further comprises:
inputting the concatenated token into the RNN in order to perform the subsequent morphological analysis process;
determining that the subsequent morphological analysis process using the RNN fails to accurately describe the document; and
adjusting, by the supervisor computer, neurons in the RNN until the subsequent analysis process using the RNN accurately describes the document.

12. The computer program product of claim 9, wherein the program code is provided as a service in a cloud environment.

13. A method comprising:
morphologically analyzing, by a supervisor computer, a document using a system dictionary, wherein the document describes a need of a user;
adding, by the supervisor computer, delimiters of sentences, delimiters of tokens, and annotations of parts of speech in the document;
changing, by the supervisor computer, a result of the morphological analysis of the document through an annotating operation, wherein the annotating operation comprises:
providing, by the supervisor computer, a user dictionary for holding token information specific to the user;
dividing, by the supervisor computer, a token in the document into a first sub-token having a boundary that begins with a start point of a mention and a second sub-token that ends at an end point of the mention;
determining, by the supervisor computer, that the start point/end point of the mention does not coincide with a start point/end point of the first sub-token;
in response to determining that the start point/end point of the mention does not coincide with the start point/end point of the first sub-token, concatenating, by the supervisor computer, the first sub-token with the second sub-token to create a concatenated token; and
storing, by the supervisor computer, the concatenated token in the user dictionary for the document;
performing, by the supervisor computer, a subsequent morphological analysis process using the system dictionary and the concatenated token from the user dictionary;
in response to performing the subsequent morphological analysis process using the system dictionary and the concatenated token from the user dictionary, determining, by the supervisor computer, that the document states that the user needs a particular software application to be activated; and
in response to determining that the user needs a particular software application to be activated, activating, by the supervisor computer, the particular software application in order to meet the need of the user.

14. The method of claim 13, further comprising:
presenting, by the supervisor computer, a link to the software application to a client computer that is used by the user;
receiving, by the supervisor computer, an activation signal of the link from the client computer; and transmitting and activating, by the supervisor computer, the software application in the client computer in response to receiving the activation signal of the link from the client computer.

\* \* \* \* \*